United States Patent
Ojima

[11] Patent Number: 5,106,344
[45] Date of Patent: Apr. 21, 1992

[54] TENSION FOR A BELT OR CHAIN

[75] Inventor: Juji Ojima, Kanagawa, Japan

[73] Assignee: NHK Spring Co., Ltd., Yokohama, Japan

[21] Appl. No.: 704,956

[22] Filed: May 23, 1991

[30] Foreign Application Priority Data

May 24, 1990 [JP] Japan ................. 2-134918

[51] Int. Cl.⁵ ............................................ F16H 7/08
[52] U.S. Cl. ............................... 474/138; 474/117
[58] Field of Search ............... 474/101, 109–111, 474/113–117, 133, 135, 136, 138

[56] References Cited

U.S. PATENT DOCUMENTS

| 4,902,266 | 2/1990 | Ojima et al. | 474/138 X |
| 4,959,041 | 9/1990 | Ojima et al. | 474/138 X |
| 4,981,460 | 1/1991 | Ojima | 474/138 X |
| 4,995,854 | 2/1991 | Ojima | 474/138 X |

Primary Examiner—Thuy M. Bui
Attorney, Agent, or Firm—Fleit, Jacobson, Cohn, Price, Holman & Stern

[57] ABSTRACT

A tensioner to be used keeping a cap of a tension rod up for tensioning a belt or chain wherein an air vent releasing an inner pressure of a casing by a vertical orifice formed on the center of the cap of tension rod and connected with a horizontal orifice formed through the cap and the tension rod. A spring pin is inserted into the horizontal orifice keeping the abutted edges thereof up so as to prevent a leakage of lubrificant.

4 Claims, 2 Drawing Sheets

TENSION FOR A BELT OR CHAIN

BACKGROUND OF THE INVENTION

The present invention relates to a tensioner for tensioning a belt or chain driving a camshaft of engine of motorcycle or automobile.

The tensioner is used to maintain a constant tension on a chain or belt when the belt or chain is slackened due to wear or elongation.

FIG. 5 shows a conventional tensioner disclosed by a Japanese Utility Model Application Laid-open No. 62-19015, which comprises a bored casing 1 to be installed perpendicularly on an equipment fastening bolts through two holes 1a provided on a wing portion thereof, a rotatable cylinder 2 rotatably inserted into the casing 1, a tension rod 3 engaged with a threaded portion of the rotatable cylinder 2 and urged by an urging force converted from a rotating force of the rotatable cylinder 2, a torsion spring 4 externally inserted over the rotatable cylinder 2 for driving the rotatable cylinder 2 and a non-circular bearing 5 fixed in the bored portion of the casing 1 for restraining the rotation of the tension rod 3. When the rotatable cylinder 2 is energized by the torsion spring 4 and the tension rod is abutted on a chain or belt, a rotational force of the torsion spring is transmitted to the tension rod. However, the rotational force is converted into a urging force on the rotatable cylinder 2 tensioning a chain or belt. In this manner, a constant tension is maintained on a chain or belt.

In this type of tensioner, it is necessary to close the casing hermetically in order to prevent a leakage of lubrificant filled in the casing 1. Therefore, a sealing bolt 7 is screwed in the lower end of the casing 1. A boot 6 is mounted between the upper end of the casing 1 and the neck portion of the tension rod so as to close the casing 1 hermetically, wherein the upper portion of the boot 6 is fixed on the tension rod with a snap ring 8 and the lower end is connected to the upper end of the casing 1 with a retainer 9. An orifice of "T" form air vent 11 is formed on a head piece 12 of the tension rod 3 so as to release the inner pressure variance of the casing due to an axial movement of the tension rod. The lower end of the air vent 11 is open over the oil level of lubrificant.

Also, it is necessary to lock an axial movement of the tension rod 3 during transport or storage. Therefore, a holder 10 is used to retain an urging force of the tension rod 3, of which hook portions 10a are inserted into the outer surface of the casing 1. The holder 10 is taken out when the tensioner is installed on an equipment.

However, the air vent 11 is always open during transport or storage. Accordingly, a leak of lubrificant from the air vent is unavoidable because of a slight vibration or positional variation during transport, or an expansion of the lubrificant when an environmental temperature increases during storage or transport.

The present invention was developed taking these situations in consideration and provides an air releasing and oil leak proof tensioner.

BRIEF DESCRIPTION OF THE INVENTION

In order to carry out the aforementioned object, a tensioner according to the present invention has a rotatable cylinder engaged with a tension rod, a torsion spring for energizing the rotatable cylinder and a boot for hermetically covering a gap between the tension rod and the casing, wherein a rotational force on the rotatable cylinder is connected into an urging force on the tension rod. The urging force on the tension rod can be held by a holder. An air vent comprises a vertical orifice formed in a cap thereof of which bottom is connected with a horizontal orifice formed horizontally in the head thereof. A spring pin is inserted in the horizontal orifice through mating orifices formed on the tension rod so that abutted edges thereof face the upper wall of the orifice.

The upper end of the vertical orifice has a large diameter portion which is closed preferably by a protrusion formed on the inside center of a bail proton of aforementioned holder or a piece of elastic material fixed in place of the protrusion during storage or transport. Accordingly, the leakage of lubrificant can be prevented and the holder stays in position when mounted.

The horizontal orifice having a spring pin therein still has a gap formed by the upper wall of the horizontal orifice and abutted edges of the spring pin which serves to transmit an inner pressure of the casing. In this case, the spring pin works not to let lubrificant leak, but the gap connected to the vertical orifice works to transmit the inner pressure of the casing to outside when the tensioner is in operation.

DETAILED DESCRIPTION OF THE PREFERRED EMBODIMENTS

Figure 1:
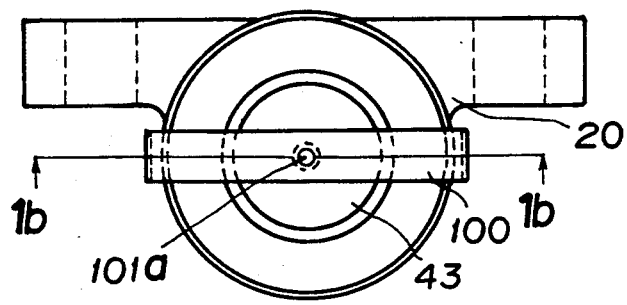
FIGS. 1a, 1b and 1c show a plan view, a sectional view and a bottom view of an embodiment according to the present invention respectively.
Figure 1:
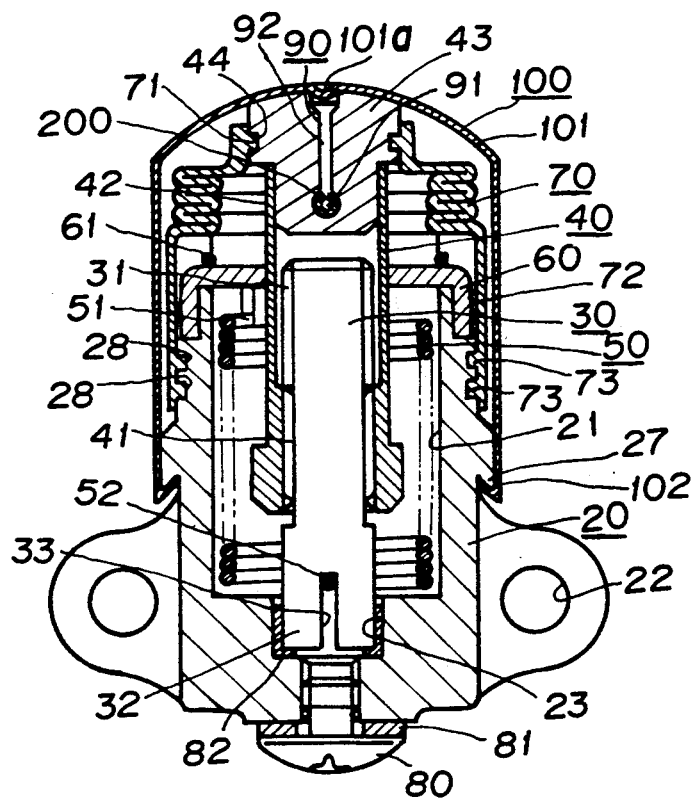
Figure 1C:
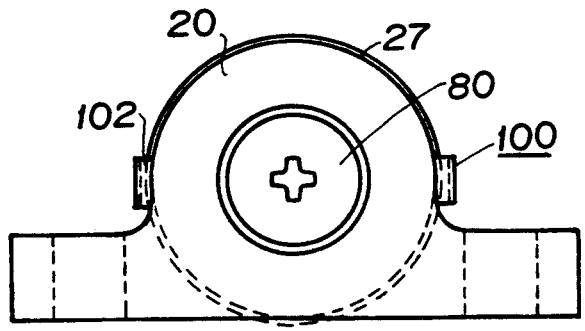

An integral construction of an embodiment according to the present invention will be described referring to FIGS. 1a, 1b 1c. The tensioner comprises a casing 20 having an axially bored portion 21 therein, a tension rod 40 engaged with a rotatable cylinder 30 both inserted in the bored portion 21 of the casing 20, a torsion spring 50 for energizing the rotatable cylinder 30, a non circular bearing 60 fixed on the top portion of the casing 20 and restraining the rotation of the tension rod 40 and a boot 70 covering a gap between the casing 20 and the tension rod 40.

The casing 20 has a wing portion provided with fixing holes 22, by which the tensioner is installed on an engine. The lower end of the casing is sealed with a bolt 80 and a gasket 81.

The rotatable cylinder 30, having a male threaded portion 31 on the upper portion thereof and a shaft portion 32 at the lower end thereof, is rotatably inserted in the bored portion 21 and is rotated by the torsion spring 50. The shaft portion is provided with a slit 33 and is supported by a thrust bearing 82 fitted in a bearing portion 23 of the casing 20. A Lower hook 52 of the torsion spring 50 is inserted in the slit 33. An upper hook 51 of the torsion spring 50 is fixed on the casing 20.

The tension rod 40 unrotatably supported by the bearing 60 is of non-circular tubular form 42, of which inner wall has female threaded portion 41 engaged with the male thread portion 31 of the rotatable cylinder 30. A cap 43 is fitted in the tension rod and locked by a spring pin 200. Then, a rotating force of the torsion spring obtained by rotating the slit 33 with a tool such as screw driver is transmitted to the rotatable cylinder 30 and converted into an urging force on the tension rod 40 because of the non-circular bearing 60. Accordingly, the cap 43 of the tension rod urges to tension a belt or chain.

The cap 43 is provided with an air vent 90 having a vertical orifice 92 having a connected with a horizontal orifice 91 which transmits an inner pressure of the bored portion 21 of the casing 20. The aforementioned spring pin 200 is inserted in the horizontal orifice 91 so as to fix the cap 43 on the upper end of the tension rod 40.

Figure 2:
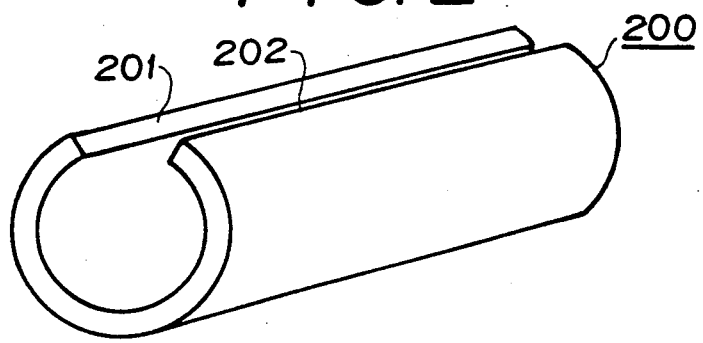
FIG. 2 shows a diagonal view of a spring pin used in this embodiment.
Figure 3:
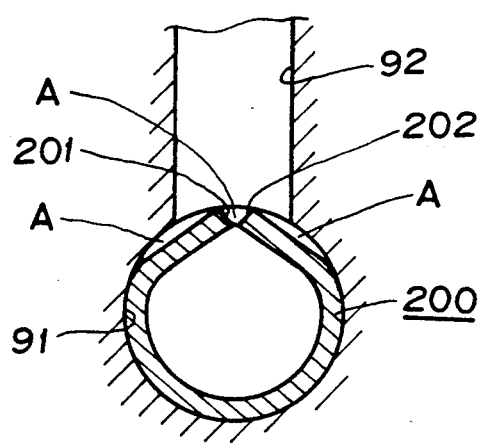
FIG. 3 shows a sectional view of vertical and horizontal orifices and a sprig pin inserted therein.

The spring pin 200 is shown in FIG. 2. When the spring pin is pressed into the horizontal orifice 91 facing the upper wall of the orifice 91, there is formed gaps A by the upper wall of the orifice 91 and abutted edges 201 and 202 of the spring which serves to transit the inner pressure of the bored portion 21 of the casing 20. Also, the spring pin 200 works to prevent a leakage of lubrificant.

The torsion spring 50 is inserted externally over the rotatable cylinder 30 which is externally engaged with the tension rod 40, forming a three layered construction which has a sufficient stroke of tension rod for its length.

A holder 100 is used to lock the urging tension rod 40 during storage or transport, which is made of strap form material. Both hook portions 102 are hooked in ring gap 27 formed on the outer surface of the casing 20. A bail portion 100 is provided with an abutting portion 101 having a protrusion 101a which is inserted in the air vent 90 of the tension head 43 so as to prevent a leakage of lubrificant and secure the holder in holding position.

The boot 70 covers a gap between the cap 43 of tension rod and the casing 20 of which ring portion 71 is inserted in a ring groove 44 formed on the outer surface of the cap 43. Another ring portions 73 formed on the inner wall of a skirt portion 72 of the boot 70 is inserted in ring grooves 28 formed on the outer surface of the casing 20.

The tensioner having the aforementioned structure is perpendicularly mounted on an engine keeping head 43 up and the holder is taken out, then the head 43 abuts on a belt or chain.

Figure 4:
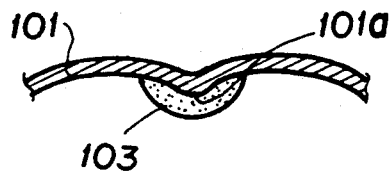
FIG. 4 shows a sectional view of a protrusion formed on a holder.
Figure 5:
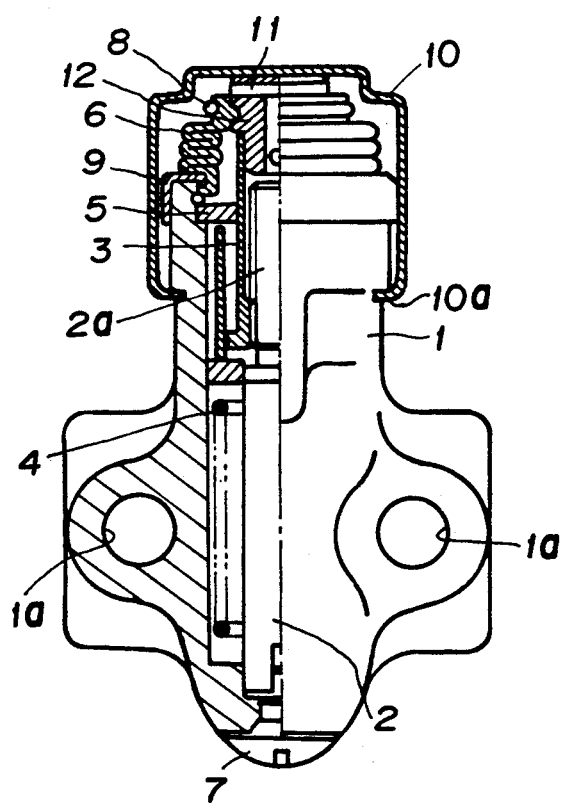
FIG. 5 shows a sectional view of a conventional tensioner.

FIG. 4 shows a variation of the holder 100, wherein an elastic piece 103 such as rubber is fixed on a protrusion 101a formed on the abutting portion 101 of holder. Accordingly, the elastic piece 103 closes the orifice 90 when mounted on the cap 43 and prevents a leafage of lubrificant during transport and storage.

Also, the sectional form of the horizontal orifice 91 may be changed as far as the aforementioned gaps A are formed by the spring pin 200 and the inner wall of the orifice 91.

In this way, the tensioner according to the present invention works to prevent a leakage of lubrificant during transport and storage, and release the inner pressure of the bored portion of casing while in operation.

What is claimed is:

1. A tensioner to be used keeping a cap of a tension rod up, wherein said tension rod engaged with a rotatable cylinder and a torsion spring driving the rotatable cylinder are inserted in a casing and hermetically sealed by a boot, and a rotating force applied on the rotatable cylinder by the torsion spring is converted into an urging force on the tension rod due to a noncircular bearing fixed in said casing, comprising:
    an air vent comprising a vertical orifice connected with a horizontal orifice both formed in said cap of said tension rod in reversed letter form "T" so that an upper end of said vertical orifice is open to the outside through the top of said cap and both ends of said horizontal orifice are open to the inside of said casing through orifices formed in mating positions of said tension rod;
    a spring pin inserted through said horizontal orifice of tension rod keeping abutted edges thereof up so as to fix said cap on said tension rod; and
    a holder comprising a bail portion for holding said cap and a pair of hooks inserted into a ring gap formed on the outer surface of said casing.

2. Said vertical orifice according to claim 1 is provided with a large diameter portion on an opening end thereof.

3. Said bail portion of holder according to claim 1 is provided with a protrusion in the inside center thereof so as to fit into said large diameter portion of said vertical orifice.

4. Said protrusion according to claim 3 is provided with an elastic piece.

* * * * *